United States Patent [19]
Esser

[11] 3,857,311
[45] Dec. 31, 1974

[54] METHOD AND APPARATUS FOR MANUFACTURING WIRE SECTIONS WITH RELIEVED ENDS

[75] Inventor: Paul Esser, Cologne, Germany

[73] Assignee: Meyer, Roth & Pastor Maschinenfabrik GmbH, Cologne, Germany

[22] Filed: Aug. 8, 1972

[21] Appl. No.: 278,868

[30] Foreign Application Priority Data
Aug. 19, 1971 Germany............................ 2141513

[52] U.S. Cl............................ 83/51, 59/35, 83/697, 225/103
[51] Int. Cl........................ B23d 15/00, B26d 3/16
[58] Field of Search ............... 83/51, 692, 693, 697; 225/103, 1, 93; 59/35

[56] References Cited
UNITED STATES PATENTS

| | | | |
|---|---|---|---|
| 1,366,063 | 1/1921 | Culhane, Jr........................ | 83/51 X |
| 2,025,557 | 12/1935 | Stahl..................................... | 59/35 |
| 2,057,928 | 10/1936 | Stahl..................................... | 59/35 X |
| 2,368,271 | 1/1945 | Pierre................................... | 59/35 |

Primary Examiner—Frank T. Yost
Attorney, Agent, or Firm—Holman & Stern

[57] ABSTRACT

Shearing tools for producing wire sections adapted to be welded in which the wire ends include a polygonal central cross section surrounded by divergent relief surfaces corresponding to the shape of the shearing blades and/or with the central cross section projecting axially from the divergent surfaces in which the shear blades operate as cooperating pairs urged toward each other and in which the blades have a V-shape in plan and include a diametrical cutting edge comprising sections intersecting inwardly of the leading edge of the cutting tool whereby the wire is pre-notched at its outer surface in a progressive, uniform shearing action and is subsequently severed at the polygonal cross section whereby welding of the wire ends is facilitated.

4 Claims, 7 Drawing Figures

PATENTED DEC 31 1974 3,857,311
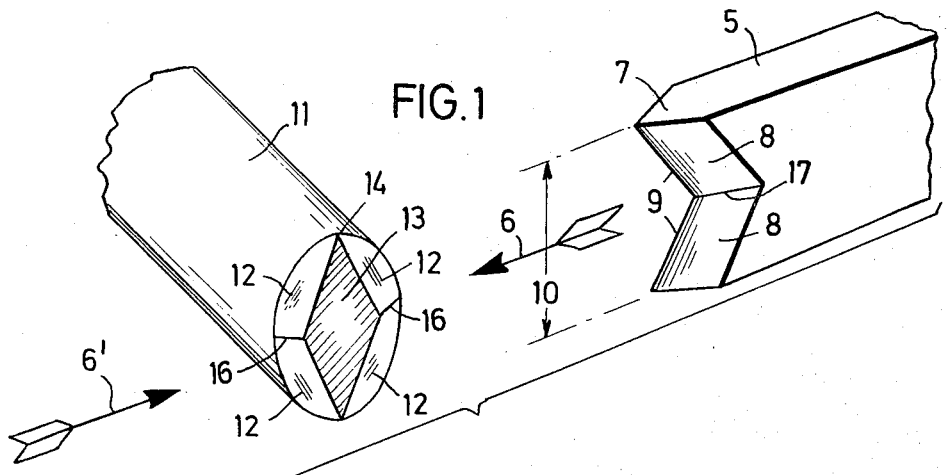
FIG.1
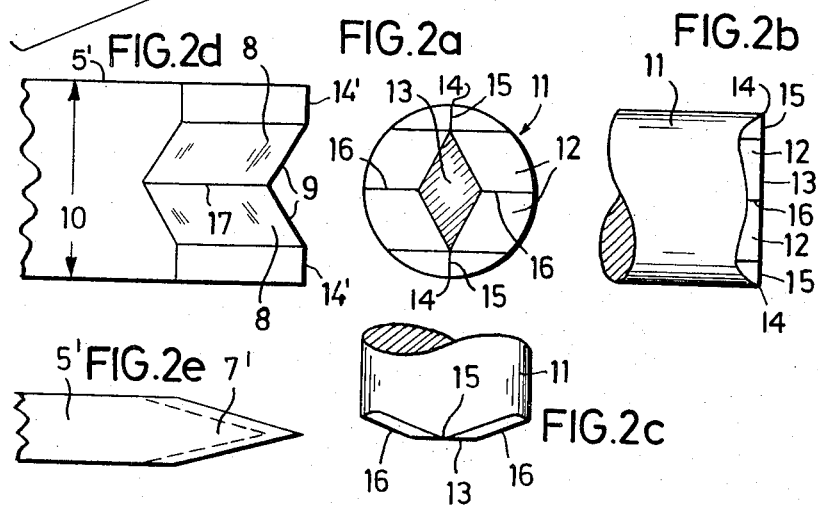
FIG.2d  FIG.2a  FIG.2b
FIG.2e  FIG.2c
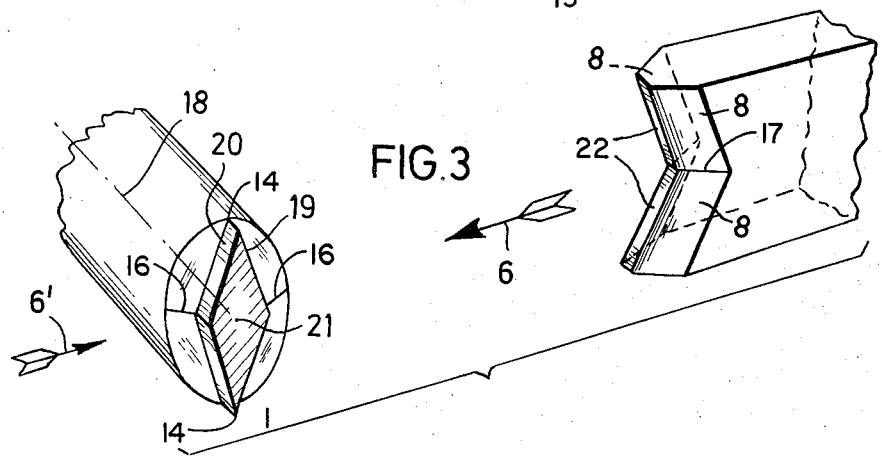
FIG.3

METHOD AND APPARATUS FOR MANUFACTURING WIRE SECTIONS WITH RELIEVED ENDS

BACKGROUND OF THE INVENTION

The instant invention concerns apparatus for manufacturing wire sections with rounded or relieved ends. Prior art apparatus has been provided with notched shear blades which are arranged to be moved simultaneously from opposite sides towards the longitudinal wire axis forming V-shaped wire ends in top view, i.e., vertical to the shear blade and to the longitudinal wire axis.

In prior art devices, the shear blades generally shaved a straight or linear cutting line which are guided until they completely touch each other, so that the wire is sheared and separated in the device itself. If the wire sections remain in this position during further processing, for example, during the pre-bending into chain links and during the consecutive welding of the ends, then the edges which are formed or developed on the wire sections touch each other along their entire lengths; this is of a disadvantage when welding inasmuch as the welding heat developes along a diametric line, namely, simultaneously in the center of the crosscut and in the peripheral sections which are part of the diameter and other peripheral sections, which are not part of the diametric line are later reached by the heat and made to participate. Thus, in the welding, since it is known that during the welding of bar-shaped workpieces, welding from the inside towards the outside has substantial disadvantages, especially in the case where the C-shaped pre-bent chain links are welded, where the link-sides, after the pre-bending, are not precisely aligned. Such wire ends, which are rounded or relieved by means of a prior art device (US Pat. No. 2,025,557), are suitable for special purposes only, but are not suitable for the use as pins or lengths for C-shaped, pre-bent chain links.

For this reason, it has been proposed to use pins in which the cutting edges of the V-shaped or relieved rounded ends on the C-shaped, pre-bent chain links cross, at a 90 degree angle (US Pat. No. 2,771,735); it is, however, not disclosed how these cuts are produced, and it is not apparent how to achieve this end in the above-mentioned patent. Furthermore, prior art pins have the disadvantage in the the upsetting-path becomes undesirably large, so that disadvantageous stresses develope in the chain links. The same holds also true for the welding of open lengths.

Finally, it is also known in prior art to move a device for the rounding or relieving wire links which cut to certain lengths, especially for C-shaped curved chain links, in a manner so that the notched steels or shear blades, during a working phase, arrive consecutively from opposite directions to effect the cut, whereby such a prior art device is provided with a movable frame arranged in front of a cutting carrier and being disposed vertical in a plane to the wire axis; the notched steels or blades are thereby placed in the frame in pairs opposite to each other, and the frame is provided with a number of movements equal to the number of operational directions of the notched blades. This device is not sufficiently efficient, since the blades stress the wire unequally and not centrally and thus impede or stress the subsequent bending.

For this reason, such devices are used mainly in a manner whereby the notched blades are replaced by cuts which are not guided vertically towards the wire-axis, but allow a centric crosscut to remain in cut sections from the wire. In this way, a wire section is obtained having somewhat pyramidal rounded or relieved ends, whereby the blunt areas are in general vertical to the wire axis and to a great extent communicate (touch) each other on their entire surface, even then when they are utilized on a C-shaped pre-formed chain link. Also, this apparatus and its related method produce disadvantages: as in the respective utilization of notched blades, they are subject to impactstresses to such an extent, that critical and precise guiding is required between two guide-carriers to support the wire on both sides of the cutting points. Most of all, however, minute shavings (or chips) are produced, which embed themselves into the parts of the apparatus and cause work interruptions. The plural movements of the working blade or tool requires a relatively high number of components and requires a relatively long period during each cutting operation.

FIELD OF INVENTION

It is the scope of the instant invention to provide an apparatus which enables the manufacture of wire-sections, in which a blunt end, running generally vertical to the longitudinal wire axis, remains in the areas of the wire axis, while the remaining surfaces are relieved divergently from the blunt end.

The instant invention accomplishes this end utilizing the above-described device for manufacturing wire sections (US Pat. No. 2,025,557), which is provided with notced blades and which blades are moved from opposite sides to the wire-axis simultaneously, having, in a top view, i.e., vertical to the blades and to the wire-axis, in general V-shaped tool steel-ends. To solve this task, it is necessary only that the cutting edges of the blade are curved or are substantially concave to each other.

Utilizing the prior art apparatus as a starting point, the improvement provides the advantage of a stress-less separation of the wire sections and removes the disadvantages of the prior art, in which there are developed cutting chips which may disrupt operation of the entire apparatus. The instant invention retains herewith the advantages of the prior art apparatus on which the instant invention is based, whereby one-sided stresses are completely avoided so that deformations are no longer expected. It avoids thereby, however, the disadvantage of the prior art apparatus so that welding can be effected evenly over a wire-diameter because the concave curvature of the cutting edges of the notched blades result in a preferable remaining cross-cut in the areas of the wire-axis, so that after separating this cross-cut there are provided blunt surfaces which are generally vertical to the wire axis, and welding is accomplished over these blunt surfaces from the center outwardly. This provides a satisfactory manufacturing method wherein it is not necessary that the notched cut is produced first, while afterwards, and preferably on a further operational point, the separating is made by a shearing-off operation.

The shape of curving the cut surfaces may vary, and so may the manner by which such curvatures are produced. In its simplest form, two substantially concave cylindrical cutting surfaces are produced on each blade, whereby the cylindric axis is less than an angle to the steel-axis, so there results the inventive, concave cut by means of the penetration-line of the two cylinders.

The instant invention is illustrated schematically in the drawings, showing various embodiments.

These, together with other and more specific objects and advantages will become apparent from the following description when taken in conjunction with the drawings forming a part thereof, in which:

BRIEF DESCRIPTION OF THE DRAWINGS

FIG. 1 is a diagramatic perspective view illustrating a work piece (wire) having been severed according to the invention, in relation to the path of movement of a pair of cooperating shear blades (one shown in detail);

FIG. 2a is an end elevation of another work piece (wire) having a modified finished surface;

FIG. 2b is a side elevation of FIG. 2a;

FIG. 2c is a top plan view of FIG. 2a;

FIG. 2d is a side elevational view of a shear blade used to produce one side of the finished end face shown in FIG. 2a;

FIG. 2e is a top plan view of FIG. 2d; and

FIG. 3 is a diagramatic perspective view, similar to FIG. 1 and showing another embodiment of the invention.

DESCRIPTION OF PREFERRED EMBODIMENTS

FIG. 1 illustrates the path of movement of two notched shears 5, (only one shown in detail), which are arranged in opposed relation in accordance to arrows 6 and 6', and are movable in opposite direction simultaneously by means of apparatus, not shown. The cutting end 7 is provided with parallelogrammatic cutting surfaces 8 in the interest of easy production and a simple regrinding, and the cutting surfaces 8 are placed towards each other in such a manner so that they produce a V-shaped concave cutting edge 9. The height 10 of the blades is in accordance with the diameter of the wire or work piece 11 so that this wire is provided at each end with four pyramidal blunt or relieved surfaces 12 and a remaining rhombic cross section 13 with tips 14 reaching up to the outer surfaces of the wire. The blunt relieved surfaces 12 and rhombic cross section 13 provide an improved weld-receiving surface.

In order to still further improve the welding from the inside of the wire towards the outer surface over a central cros section, the arrangement of end 7' as seen in FIG. 2 is provided. The cutting edge 9 of the shear blades (similar to FIG. 1) is supplemented at its ends by border-cutting edges 14' which are vertical to the shear blade longitudinal axis and the feed-direction 6, whereby the border-cutting edge 14' of the two notched cutters 5', in the end position, are placed in immediate confronting poximal relationship and produce on the wire 11, diametrical margins 15 which are formed above and below the rhombic cross section 13 and on a cross-sectional diameter, while pyramidal side edges 16 are formed by the longitudinal cutting-notches 17 in the same manner as in the embodiment shown in FIG. 1.

A further embodiment of the instant invention is shown in FIG. 3 wherein the cutting edges are formed substantially in accordance with FIG. 1, and in which there is incorporated, for manufacturing/technical reasons, blunt lands or cutting front-surfaces 22 which will engage in a plane parallel to the longitudinal wire axis 18. In this manner there is developed on the wire section a core-prism 19 with side-surfaces 20 corresponding to the blunt land surfaces 22, and with a transverse cross-sectional surface 21. It has been noted that during the separation of wire sections there are developed core-prisms of three dimensions, namely, approximately half the height in relation to the width of the cutter notches 17, however, the separation on the half may be improved in that the blunt surfaces 22 are convex in profile so that the weakest cross section is in the center.

The inventive apparatus offers the advantage because of the stress-less forming of the work piece ends; the work piece material is compressed in the separating point. The operational method may also be changed in the same manner as the apparatus itself. Thus, according to the respective brittleness or hardening of the work material, the remaining cross section and accordingly the form of the notched blades may be chosen in a manner so that the wire is broken during the notching which eliminates the need for the subsequent separating phase. The instant invention offers the additional advantage wherein the guide-carriers, even though being useful, are however no longer required, while a special characteristic of the invention consists in that during the process of the notching, the wire is secured in a dependable manner so that the guide-device, which is preswitched to such an inventive apparatus, can be drawn back into its starting position, without causing the danger of the wire being pulled out of position by the guide-device. The present invention does not require that special holder-devices be provided for the wire on the entire apparatus during retraction of the guide-device.

What is claimed is:

1. In an apparatus for shearing sections of wire preparatory to welding the sheared sections from an inwardly disposed axial core defined by rearwardly disposed relief surfaces, said apparatus including a pair of shear blades movable from opposite directions in proximal relation during a single shear stroke effected by simultaneous movement of said shear blades transversely of the longitudinal axis of the wire being sheared, the improvement in which said blades each have a generally V-shaped profile both in top plan and in side elevation and define a leading, notched, transverse cutting edge along it entire length corresponding to a corresponding transverse demension of the wire being sheared, the cutting edge of the respective blades comprising a plurality of planar surfaces converging toward each other and toward the leading cutting edge, the cutting edges of the respective blades cooperating and forming a rhombic opening when viewed in side elevation and meeting in proximal relation substantially coincident with the outer surface of the wire section being severed during a single shear stroke.

2. The improvement as claimed in claim 1 in which the cutting edges include diametrically colinear portions in spaced relation and flanking the the V-shaped profile in side elevation.

3. The improvement as claimed in claim 1 in which the cutting edges include transverse lands for producing a wire end having a prismatical core projecting axially from the wire and including relieved areas extending from the base of the core to the outer surface of the wire.

4. The method of shearing wire sections to provide the sheared ends with an optimum configuration to facilitate welding in which the wire ends include an axial, prismatic core flanked by rearwardly divergent, substantially planar relief surfaces, comprising in combination, the steps of:
A. providing a pair of shear blades in axial alignment and having a V-shape in top plan and a leading, V-shaped diametrical cutting edge in side elevation, in which the cutting edge is defined by sections diverging inwardly of the cutting edge and intersecting at a longitudinal common margin diverging from an intermediate point on the cutting edge when viewed in side elevation;
B. positioning a wire section having a diameter substantially equal to the length of the cutting edges transversely between the confronting cutting edges of the blades;
C. shearing the transverse wire in a single simultaneous stroke of the shear blades by moving the cutting edges at upper and lower ends into the side margins into proximate relation whereby the prismatical core and flanking relief surfaces are formed simultaneously within the diameter of the wire section.

* * * * *